UNITED STATES PATENT OFFICE.

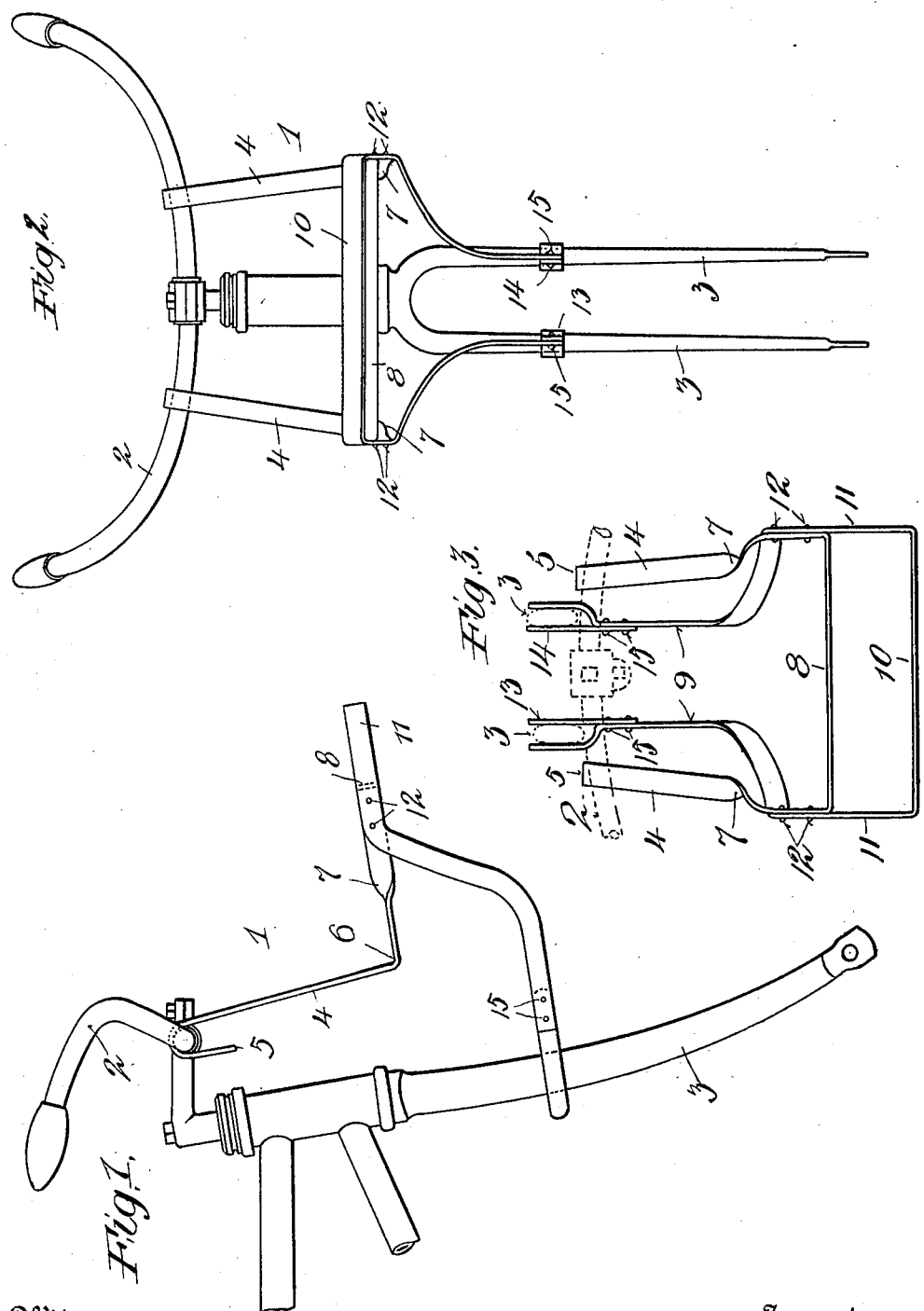

JULIUS BIDERMAN, OF NEW YORK, N. Y.

LUGGAGE-CARRIER.

1,031,165.  Specification of Letters Patent.  Patented July 2, 1912.

Application filed May 6, 1910. Serial No. 559,858.

*To all whom it may concern:*

Be it known that I, JULIUS BIDERMAN, a citizen of the United States, and a resident of the city and State of New York, borough of Brooklyn, county of Kings, have invented a new and useful Improvement in Luggage-Carriers, of which the following is a specification.

The object of my invention is to provide a device of this class that will be simple in construction and efficient and durable in operation. This object is accomplished by my invention, one embodiment of which is hereinafter described.

For more particular description of my invention, reference is to be had to the accompanying drawings, forming a part hereof, in which—

Figure 1 is a side elevation of my improvement applied to a bicycle. Fig. 2 is a front elevation of the same. Fig. 3 is a plan view of my improvement with parts of a bicycle indicated by dotted lines.

Throughout the various views of the drawings similar reference characters designate similar parts.

My improved luggage carrier 1 is applied to the handle bars 2 and front fork 3 of a bicycle as follows. The carrier 1 is composed of four bars and some rivets as well as cushions, not shown, that protect the bicycle. The bar 4 has hooks 5 at each end which rest in the handle bar, as shown, and below the hooks and in front of the handle bar 3 the bar 4 is downwardly and divergently disposed and then bent at right angles at 6 and twisted at 7 to present a vertical edge for the bracket portion of the carrier. Beyond the twisted portions 7 of the bar 4 its sides are united by the crossing 8.

The second bar 9 has its central part 10 on edge and parallel to the bar 8 and at each end of the part 10 are portions 11 fixed to the bar 4 by rivets 12 and beyond this the bar 9 is curved downwardly and convergently, substantially as shown, to the width of the fork 3 and is secured to this fork by suitable small bars 13 and 14 and rivets 15. The members of the fork 3 are pressed between the ends of the bar 9 and the small bars 13 and 14 through the cushions, not shown.

The structure above described is simple as it has few parts and needs no screws to hold it to a bicycle. When in place it will carry any load that the bicycle will and will not become displaced until removed by the rider or some other person. It grips the bicycle with sufficient firmness to remain in position if carried without a load.

While I have shown and described one embodiment of my invention it is obvious that it is not restricted thereto but is broad enough to cover all structures that come within the scope of the annexed claim.

What I claim is:

In a device of the class described, a bar having hooked upper ends adapted to be secured to the handle bar of a bicycle, an intermediate portion forming a crossing and connected with said ends by bent and twisted parts, a second bar having a crossing parallel with the said first mentioned crossing, parts fixed to said first mentioned bar, and downwardly and convergently bent portions with ends adapted to be secured to the front fork of a bicycle.

JULIUS BIDERMAN.

Witnesses:
GUSTAVE I. ARONOW,
SADIE M. BRODSKY.

---

Copies of this patent may be obtained for five cents each, by addressing the "Commissioner of Patents, Washington, D. C."